Figures 1, 2:
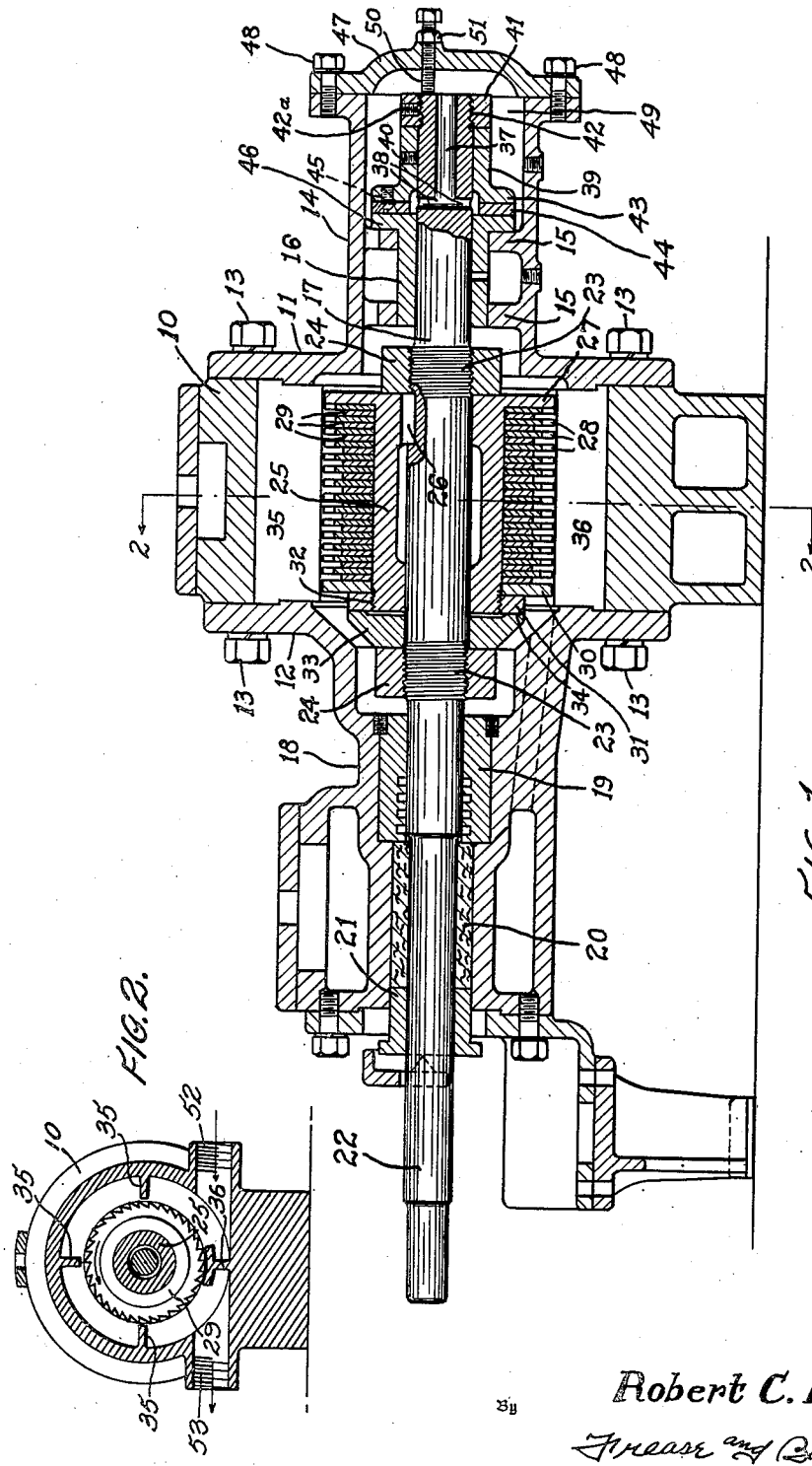

Patented Apr. 10, 1951

2,548,792

UNITED STATES PATENT OFFICE 2,548,792

INTERNAL THRUST BEARING ASSEMBLY FOR OIL MILLS LUBRICATED BY THE MATERIAL PROCESSED

Robert C. Hopkins, Alliance, Ohio

Application April 4, 1945, Serial No. 586,567

4 Claims. (Cl. 241—46)

The invention relates to thrust bearings and more particularly to a self lubricated internal thrust bearing especially adapted for use within oil mills.

In rotary oil mills of the type shown in my prior Patent No. 1,764,020 of June 17, 1930, it was found necessary in actual use to counter the thrust of the shaft, caused by the pressure within the housing producing a piston-like effect upon the shaft and moving it endwise as the pressure tries to release.

It was thus necessary to provide a thrust bearing for the shaft of such a mill and this was at first accomplished by providing a thrust bearing comprising two discs, one of steel and the other of bronze, located entirely on the outside of the mill.

The difficulty with such bearings was in properly lubricating the same by attempting to force lubricating oil between the bearings from the outside, but this was not satisfactory because centrifugal force as well as the millstone effect of the thrust bearing discs stopped the inflow of lubricating oil between the discs.

The object of the present invention is to provide an internal thrust bearing for the shaft of a rotary oil mill, located within the housing of the oil mill and so constructed and arranged that centrifugal force and the millstone action of the discs will properly lubricate the thrust bearing with the oil being milled.

Another object is to provide a thrust bearing for mills of this type in which a centrifugal pumping action is produced within the mill to lubricate the internal thrust bearing.

A further object is to provide an internal thrust bearing which includes a bearing, or bushing, for one end portion of the shaft of the mill having a thrust flange thereon for contact by a thrust plate or disc carried by a thrust collar fixed upon the shaft, the adjacent end of the shaft having a central bore, communicating with radial passages through the shaft for centrifugally discharging oil between the thrust flange and thrust plate of the bearing.

The above objects together with others which will be apparent from the drawing and following description, or which may be later referred to, may be attained by constructing the improved internal thrust bearing in the manner illustrated in the accompanying drawing in which Figure 1 is a vertical longitudinal section through a rotary oil mill provided with the improved self lubricating internal thrust bearing, and Fig. 2 is a reduced scale cross sectional view taken on the line 2—2, Fig. 1.

For the purpose of illustration, the invention is illustrated as applied to a rotary oil mill of the general type shown in my prior Patent No. 1,764,020 above referred to, but it should be understood that the improved internal thrust bearing may be applied to various types of rotary oil mills.

The mill shown includes a housing 10 having caps 11 and 12 connected to the opposite ends thereof as by the screws 13. The cap 11 has the cylindrical portion 14 within which is centrally mounted, by means of the ribs or spiders 15, a bearing or bushing 16 for the inner end portion of the shaft 17, which is located longitudinally through the mill.

A substantially cylindrical portion 18 is formed upon the cap 12, within which is mounted a bushing or bearing 19 through which the other end of the shaft 17 is journalled, the shaft being extended through the packing material 20 in the gland 21 to a point beyond the exterior of the mill as indicated at 22, for the connection of a pulley or other means for driving the shaft.

The shaft 17 is shown provided with screw threaded portions 23 at spaced points thereon to receive nuts 24 for mounting the tubular mandrel 25 upon the shaft. This mandrel may be held against rotation relative to the shaft by any suitable means such as the key 26.

An annular flange 27 may be formed upon one end of the mandrel 25 and a plurality of disc saws 28 may be mounted upon the mandrel and separated by means of spacer discs 29 of substantially the same thickness but of considerably less diameter than the disc saws.

The gang of disc saws, with spacer discs therebetween, may be clamped between the flange 27 of the mandrel and the mandrel plate or ring 30 by means of the mandrel nut 31 mounted upon the screw threaded portion 32 of the mandrel.

A lock plate or ring 33 may be interposed between one end of the mandrel and the adjacent nut 24, and may be, as shown in the drawing, located between the mandrel nut 31 and the adjacent shaft nut 24 and provided with an annular lip 34 contacting the mandrel nut.

As disclosed in my prior Patent No. 1,764,020 above referred to, the interior of the housing 10 may be divided into a plurality of attrition chambers by means of the partition walls 35 and 36 having their edges located in close proximity to the peripheral cutting edges of the disc saws 28.

Oil is admitted through the inlet 52 and passes through the several attrition chambers formed by the partitions 35 and 36, and is discharged through the outlet 53.

Thus the various impurities found in fuel oil, such as grains of coke, particles of fairly solid roasted substances, and particles of semi-solid substances such as sludge, are milled and reduced in grain size as they pass through the attrition chambers and between the edges of the partition walls and the cutting edges of the disc saws.

The rotary mill thus far described has been in use for some time, provided with an exterior thrust bearing on the left hand end of the shaft 22 as viewed in the drawing. This required making the shaft longer than shown in the drawing and the provision of a housing for the thrust bearing.

In carrying out the present invention this external thrust bearing has been eliminated and the inner end of the shaft is provided with a central longitudinal bore 37 extending inwardly from the end of the shaft and communicating with the radial passages 38 extending outward through the periphery of the shaft.

A thrust collar 39 is fixed upon this end portion of the shaft as by the set screws 40 and the nut 41 mounted upon the threaded end portion 42 of the shaft, a set screw 42a being preferably provided in the nut also, to hold it in adjusted position upon the shaft.

An annular flange 43 is formed upon the inner end of the thrust collar 39 and a thrust plate or ring 44, which may be of bronze or other suitable material, is attached thereto as by the screw 45, this thrust plate bearing against the annular thrust flange 46 upon the bearing or bushing 15, and taking the outward thrust of the shaft 17.

A cap 47 is attached to the outer end of the cylindrical portion 14, as by screws 48, closing the end of the cylindrical portion 14 and forming a chamber 49 therein communicating with the milling chamber so that the oil being milled therein may enter the chamber 49 and fill the same at all times.

An adjusting screw 50 may be located through the cap 47 to contact the adjacent end of the shaft 17 and may be held in adjusted position as by the lock nut 51.

With the chamber 49 full of oil and the shaft 17 rotating, a pumping action of the oil is produced by the shaft itself, the oil going into the central longitudinal opening 37 in the shaft and being discharged by centrifugal force through the radial openings 38 and carried outward radially between the thrust flange 46 and the thrust plate 44, the millstone action of which draws the oil outward between the thrust flange and thrust plate with the effect of increasing the speed of movement of the oil as the diameter of the flange and thrust plate increases.

This produces a very good lubrication between the thrust bearing and the thrust plate, thus overcoming the difficulty of lubricating where the thrust bearing was located externally of the mill housing and lubrication was introduced from the outside.

I claim:

1. In a rotary oil mill comprising a housing having a cylindrical extension at one end, a rotary shaft journalled within the housing and having one end located through the other end of the housing and its other end terminating within the cylindrical extension, rotary milling means fixed upon the shaft within the housing, means for passing oil to be milled through the housing, a bearing within the cylindrical extension for said last named end portion of the shaft, a thrust plate carried by the shaft for contacting the adjacent end portion of the bearing, means for admitting oil from the housing to the cylindrical extension of the housing surrounding said last named end portion of the shaft, there being a longitudinal bore through said last named end of the shaft and a radial passage through the shaft communicating with said longitudinal bore and longitudinally alined on the shaft with the meeting plane of the end of the bearing and the thrust plate, whereby said oil will enter said longitudinal bore and be discharged centrifugally from said radial passage so that the action of the rotary thrust plate will carry the oil outward between the bearing and the thrust plate to lubricate the same with oil being milled in the housing.

2. In a rotary oil mill comprising a housing having a cylindrical extension at one end, a rotary shaft journalled within the housing and having one end located through the other end of the housing and its other end terminating within the cylindrical extension, rotary milling means fixed upon the shaft within the housing, means for passing oil to be milled through the housing, a bearing within the cylindrical extension for said last named end of the shaft, a peripheral thrust flange on the outer end of said bearing, a collar fixed upon said end portion of the shaft, a thrust plate carried by the collar for contacting said thrust flange, means for admitting oil from the housing to the cylindrical extension of the housing surrounding said end portion of the shaft, and means for pumping said oil centrifugally between the thrust plate and the thrust flange whereby the action of the rotary thrust plate will carry the oil outward between the thrust plate and the thrust flange to lubricate the same with oil being milled in the housing.

3. In a rotary oil mill comprising a housing having a cylindrical extension at one end, a rotary shaft journalled within the housing and having one end located through the other end of the housing and its other end terminating within the cylindrical extension, rotary milling means fixed upon the shaft within the housing, means for passing oil to be milled through the housing, a bearing within the cylindrical extension for said last named end of the shaft, a peripheral thrust flange on the outer end of said bearing, a collar fixed upon said end portion of the shaft, a thrust plate carried by the collar for contacting said thrust flange, means for admitting oil from the housing to the cylindrical extension of the housing surrounding said end portion of the shaft, and means associated with the shaft for pumping said oil centrifugally between the thrust plate and the thrust flange whereby the action of the rotary thrust plate will carry the oil outward between the thrust plate and the thrust flange to lubricate the same with oil being milled in the housing.

4. In a rotary oil mill comprising a housing having a cylindrical extension at one end, a rotary shaft journalled within the housing and having one end located through the other end of the housing and its other end terminating within the cylindrical extension, rotary milling means fixed upon the shaft within the housing, means for passing oil to be milled through the housing, a bearing within the cylindrical extension for said last named end of the shaft, a peripheral thrust flange on the outer end of said bearing, a collar fixed upon said end portion of the shaft, a thrust plate carried by the collar for contacting said thrust flange, means for admitting oil from the housing to the cylindrical extension of the housing surrounding said end portion of the shaft, there being a longitudinal bore through said last named end of the shaft and a radial passage through the shaft communicating with said longitudinal bore, and longitudinally alined on the shaft with the meeting plate of the end of the bearing and the thrust plate, whereby said oil will enter said longitudinal bore and be discharged centrifugally from said radial passage so that the action of the rotary thrust plate will carry the oil outward between the thrust flange and the thrust plate to lubricate the same with oil being milled in the housing.

ROBERT C. HOPKINS.

REFERENCES CITED

The following references are of record in the file of this patent:

UNITED STATES PATENTS

| Number | Name | Date |
|---|---|---|
| 1,272,041 | Herr | July 9, 1918 |
| 1,591,361 | Church | July 6, 1926 |
| 1,690,425 | Norton | Nov. 6, 1928 |
| 1,721,121 | Jensen | July 16, 1929 |
| 1,764,020 | Hopkins | June 17, 1930 |
| 1,979,957 | Campbell | Nov. 6, 1934 |
| 2,066,281 | Traylor | Dec. 29, 1936 |
| 2,270,946 | Hopkins | Jan. 27, 1942 |
| 2,276,107 | Simons | Mar. 10, 1942 |

FOREIGN PATENTS

| Number | Country | Date |
|---|---|---|
| 402,994 | France | Oct. 22, 1909 |